United States Patent
Kita et al.

(10) Patent No.: US 12,494,521 B2
(45) Date of Patent: Dec. 9, 2025

(54) VOLTAGE DETECTION LINE AND VOLTAGE DETECTION LINE MODULE

(71) Applicant: SANYO Electric Co., Ltd., Osaka (JP)

(72) Inventors: Hiroaki Kita, Osaka (JP); Takashi Inamura, Hyogo (JP); Yasumasa Kojima, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 613 days.

(21) Appl. No.: 17/905,525

(22) PCT Filed: Nov. 19, 2020

(86) PCT No.: PCT/JP2020/043105
§ 371 (c)(1),
(2) Date: Sep. 2, 2022

(87) PCT Pub. No.: WO2021/186794
PCT Pub. Date: Sep. 23, 2021

(65) Prior Publication Data
US 2023/0125441 A1    Apr. 27, 2023

(30) Foreign Application Priority Data
Mar. 19, 2020    (JP) .................. 2020-049122

(51) Int. Cl.
*H01M 10/48*    (2006.01)
*H01M 10/42*    (2006.01)
*H05K 1/14*    (2006.01)

(52) U.S. Cl.
CPC ....... *H01M 10/482* (2013.01); *H01M 10/425* (2013.01); *H05K 1/147* (2013.01); *H01M 2220/20* (2013.01)

(58) Field of Classification Search
CPC ............ H01M 10/482; H01M 10/425; H01M 50/503; H01M 50/505; H01M 50/569
See application file for complete search history.

(56) References Cited

U.S. PATENT DOCUMENTS

| 2015/0011891 A1 | 1/2015 | Yamada |
| 2018/0219204 A1 | 8/2018 | Takase et al. |

FOREIGN PATENT DOCUMENTS

| DE | 10209648 A1 | 10/2003 |
| JP | 2002-141660 | 5/2002 |

(Continued)

OTHER PUBLICATIONS

International Search Report of PCT application No. PCT/JP2020/043105 dated Feb. 2, 2021.

(Continued)

*Primary Examiner* — Sarah A. Slifka
(74) *Attorney, Agent, or Firm* — WHDA, LLP (57) ABSTRACT

Voltage detection line includes: first flexible printed circuit board including a plurality of first conductive wires and first insulating film covering the plurality of first conductive wires; second flexible printed circuit board including a plurality of second conductive wires and second insulating film covering the plurality of second conductive wires; and connection part that is soldered to each of first conductive wires and each of second conductive wires corresponding to each other to electrically connect the plurality of first conductive wires and the plurality of second conductive wires, in which the plurality of first conductive wires and the plurality of second conductive wires are electrically connected to a plurality of batteries to detect voltages of the plurality of batteries.

6 Claims, 11 Drawing Sheets

(56) References Cited

FOREIGN PATENT DOCUMENTS

| | | |
|---|---|---|
| JP | 2002-299000 A | 10/2002 |
| JP | 2013-105522 | 5/2013 |
| JP | 2013-206617 | 10/2013 |
| JP | 2015-035546 A | 2/2015 |
| JP | 2015-233125 | 12/2015 |
| JP | 2017-027831 | 2/2017 |

OTHER PUBLICATIONS

Office Action dated Nov. 26, 2024, issued in counterpart JP application No. 2022-508048, with English translation. (6 pages).
Extended Supplementary European Search Report dated Jul. 26, 2024, issued in counterpart Application No. 20925476.2. (10 pages).

VOLTAGE DETECTION LINE AND VOLTAGE DETECTION LINE MODULE

CROSS-REFERENCE TO RELATED APPLICATIONS

This application is a U.S. national stage application of the PCT International Application No. PCT/JP2020/043105 filed on Nov. 19, 2020, which claims the benefit of foreign priority of Japanese patent application No. 2020-049122 filed on Mar. 19, 2020, the contents all of which are incorporated herein by reference.

TECHNICAL FIELD

The present disclosure relates to a voltage detection line and a voltage detection line module.

BACKGROUND ART

For example, as a power source for a vehicle or the like that requires a high output voltage, there has been known a battery module formed by electrically connecting a plurality of batteries to each other. In the battery module, adjacent batteries are electrically connected with each other via a bus bar. In addition, a voltage detection line is attached to each bus bar to detect a voltage between the batteries. Regarding the voltage detection line, for example, Patent Literature 1 discloses that a flexible printed circuit board (FPC) is used as the voltage detection line.

CITATION LIST

Patent Literature

PTL 1: Unexamined Japanese Patent Publication No. 2017-27831

SUMMARY OF THE INVENTION

In recent years, there has been a demand for further increasing the capacity of battery modules, and the number of arranged batteries tends to increase. Therefore, it is necessary to elongate the voltage detection line. However, the FPC has a limited length that can be manufactured due to facility restrictions, and it has been difficult to cope with an increase in the number of arranged batteries.

The present disclosure has been made in view of such a situation, and an object of the present disclosure is to provide a technique for elongating a voltage detection line including a flexible printed circuit board.

An aspect of the present disclosure is a voltage detection line. The voltage detection line includes: a first flexible printed circuit board including a plurality of first conductive wires and a first insulating film covering the plurality of first conductive wires; a second flexible printed circuit board including a plurality of second conductive wires and a second insulating film covering the plurality of second conductive wires; and a connection part that is soldered to each of the first conductive wires and each of the second conductive wires corresponding to each other to electrically connect the plurality of first conductive wires and the plurality of second conductive wires, in which the plurality of first conductive wires and the plurality of second conductive wires are electrically connected to a plurality of batteries to detect voltages of the plurality of batteries.

Another aspect of the present disclosure is a voltage detection line module. The voltage detection line module includes a voltage detection line of the above aspect and a support plate that supports the voltage detection line. The support plate has a protrusion, and at least one of the first flexible printed circuit board and the second flexible printed circuit board has a hole into which the protrusion is fitted.

Any combinations of the above configuration elements, and conversions of the expressions of the present disclosure among methods, devices, systems, and the like are also effective as aspects of the present disclosure.

According to the present disclosure, it is possible to elongate a voltage detection line formed of a flexible printed circuit board.

DESCRIPTION OF EMBODIMENT

Hereinafter, the present disclosure will be described on the basis of preferred exemplary embodiments with reference to the drawings. The exemplary embodiments are not intended to limit the present disclosure but are illustrative, and all features described in the exemplary embodiments and combinations of the features are not necessarily essential to the present disclosure. The identical or equivalent configuration elements, members, and processing illustrated in the drawings are denoted by the same reference numerals, and repetitious description will be omitted when appropriate. The scale and the shape of each part illustrated in each drawing are set for the sake of convenience in order to facilitate the understanding of the description and should not be interpreted in a limited manner unless otherwise specified. In cases where terms such as "first" and "second" are used in the present description or claims, these terms do not represent any order or importance but are intended to distinguish one configuration from another configuration, unless otherwise specified. In each drawing, some members, which are not important for describing the exemplary embodiment, are omitted.

First Exemplary Embodiment

Figure 1:
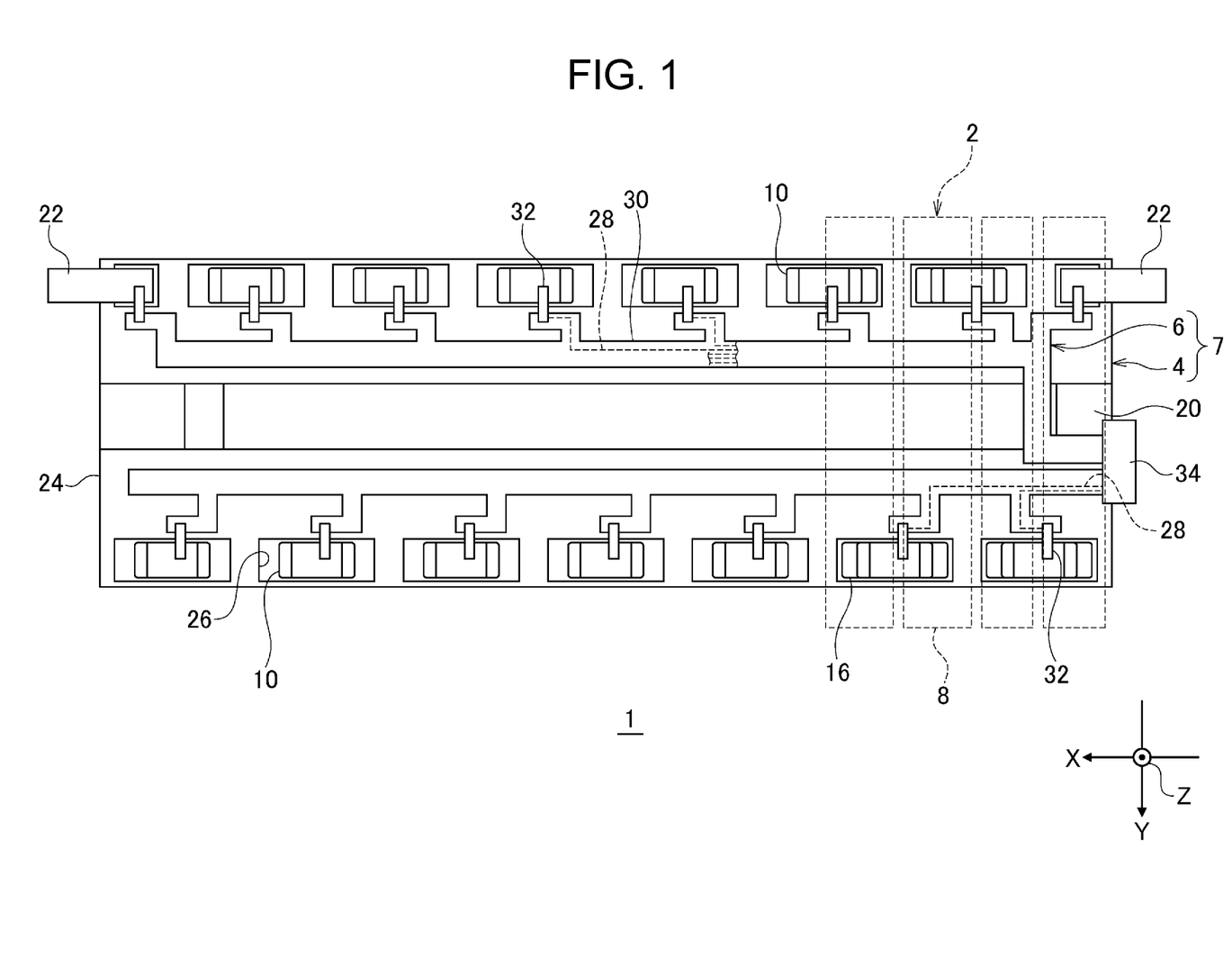
FIG. 1 is a plan view of a battery module including a voltage detection line according to a first exemplary embodiment.
Figure 2:
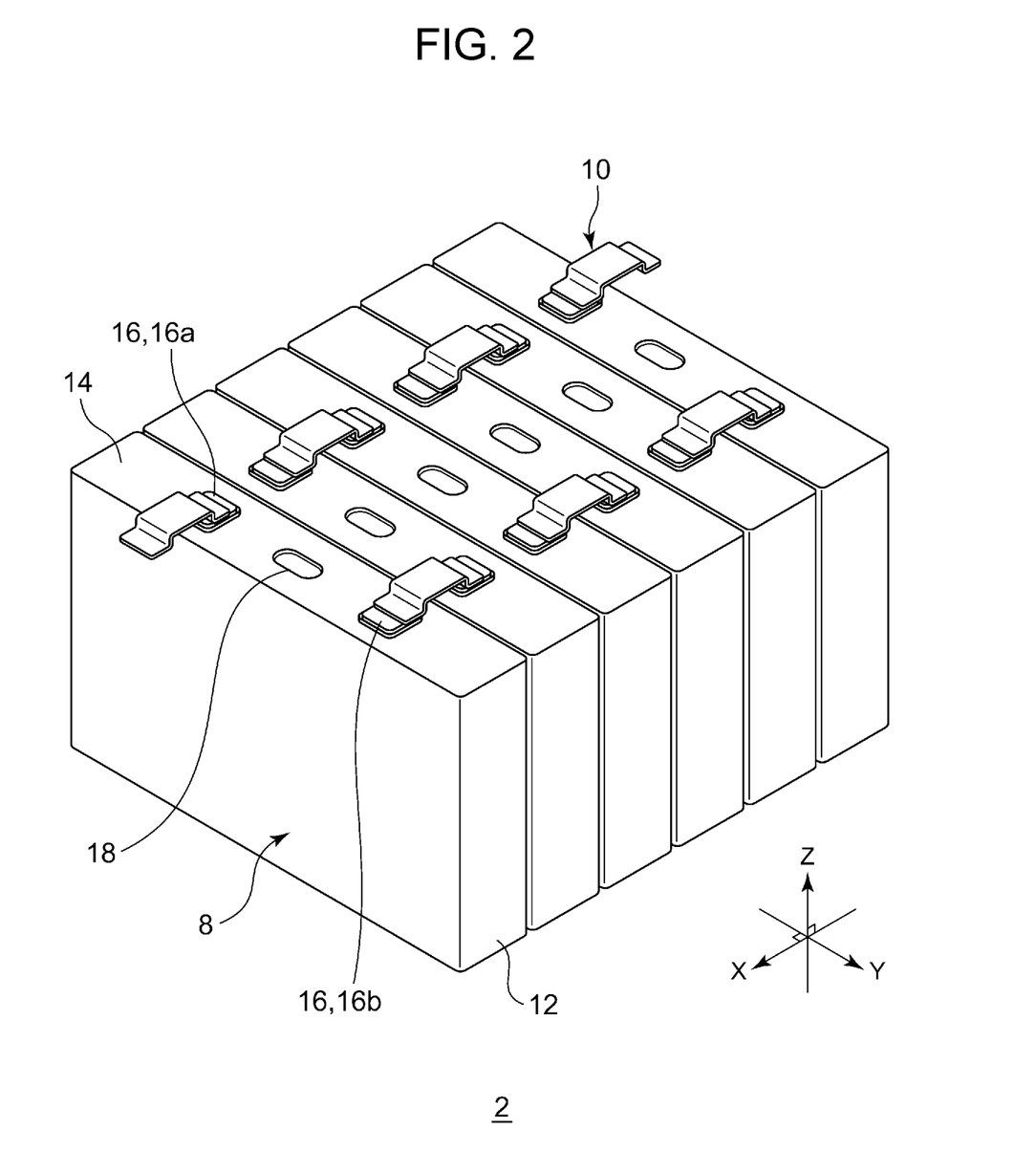
FIG. 2 is a perspective view of a part of a battery stack.

FIG. 1 is a plan view of a battery module including a voltage detection line according to a first exemplary embodiment. FIG. 2 is a perspective view of a part of a battery stack. Note that, in FIG. 1, only some batteries in the battery stack are shown by a broken line. In FIG. 1, only some conductive wires of the voltage detection line are indicated by broken lines.

Battery module 1 includes battery stack 2, support plate 4, and voltage detection line 6. Battery stack 2 has a plurality of batteries 8 arranged, and a plurality of bus bars 10 that electrically connect the batteries 8. Each battery 8 is, for example, a rechargeable secondary battery such as a lithium ion battery, a nickel-hydrogen battery, or a nickel-cadmium battery. Each battery 8 is a so-called prismatic battery, and has outer covering can 12 having a flattened rectangular parallelepiped shape. An opening (not illustrated) having a substantially rectangular shape is provided on one surface of outer covering can 12, and an electrode body, an electrolytic solution, and the like are accommodated in outer covering can 12 through the opening. Substantially rectangular sealing plate 14 for closing the opening is fitted into the opening of outer covering can 12.

Sealing plate 14 is provided with a pair of output terminals 16. Specifically, positive electrode terminal 16a is disposed near one end in the longitudinal direction, and negative electrode terminal 16b is disposed near the other end. When it is unnecessary to distinguish the polarities of the pair of output terminals 16 from each other, positive electrode terminal 16a and negative electrode terminal 16b are collectively referred to as output terminals 16.

Outer covering can 12, sealing plate 14, and output terminal 16 are conductors, and are made of metal such as aluminum, iron, or stainless steel, for example. Outer covering can 12 and sealing plate 14 are joined to each other by, for example, laser welding. Each output terminal 16 is inserted into a through hole formed in sealing plate 14. An insulating seal member is interposed between each output terminal 16 and each through hole. Outer covering can 12 may be covered with an insulating film (not illustrated) such as a shrink tube. Outer covering can 12 and sealing plate 14 may be made of an insulating resin.

Each battery 8 has a valve portion 18 on sealing plate 14. Valve portion 18 is disposed between the pair of output terminals 16 in sealing plate 14. Valve portion 18 is also referred to as a safety valve, and is configured to open when the internal pressure of battery 8 rises to a predetermined value or more to release a gas inside battery 8. Valve portion 18 includes, for example, a thin portion provided in a part of sealing plate 14 and thinner than the other portion, and a linear groove formed on the surface of the thin portion. In this configuration, when the internal pressure of battery 8 increases, the thin portion tears from the groove as a starting point, so that valve portion 18 opens. Valve portion 18 of each battery 8 is connected to gas duct 20 described later, and the gas inside the battery is discharged from valve portion 18 to gas duct 20.

In the description of the present exemplary embodiment, for convenience, sealing plate 14 is an upper surface of battery 8, and a bottom surface of outer covering can 12 facing sealing plate 14 is a lower surface of battery 8. Battery 8 has four side surfaces connecting the upper surface and the lower surface. Two of the four side surfaces are a pair of long side surfaces connected to two opposing long sides of sealing plate 14. Each long side surface is a surface having the largest area among surfaces of battery 8, that is, a main surface. The remaining two side surfaces excluding the two long side surfaces are a pair of short side surfaces connected to the short side of sealing plate 14.

For convenience, in battery stack 2, an upper surface of battery 8 corresponds to an upper surface of battery stack 2, a lower surface of battery 8 corresponds to a lower surface of battery stack 2, a surface formed by a group of the short side surfaces of cells 8 corresponds to a long side surface of cell stack 2, and in cell stack 2, a long-side-surface side of cell 8 corresponds to a short side surface of cell stack 2. These directions and positions are defined for convenience. Therefore, for example, a portion defined as the upper surface in the present disclosure does not mean being always located above a portion defined as the lower surface.

The plurality of batteries 8 are arranged at predetermined intervals such that main surfaces of adjacent batteries 8 face each other. In the present exemplary embodiment, batteries 8 are arranged in the horizontal direction. Hereinafter, a direction in which batteries 8 are arranged is appropriately referred to as first direction X, a horizontal direction intersecting the first direction X is appropriately referred to as second direction Y, and a vertical direction intersecting the first direction X and the second direction Y is appropriately referred to as third direction Z. In the present exemplary embodiment, first direction X, second direction Y, and third direction Z are orthogonal to each other.

Each battery 8 is disposed such that output terminals 16 are directed in the same direction. In the present exemplary embodiment, each battery 8 is disposed such that output terminals 16 are directed upward in the vertical direction. When adjacent batteries 8 are connected in series, batteries 8 are arranged such that positive electrode terminal 16a of one battery 8 and negative electrode terminal 16b of other battery 8 are adjacent to each other. When adjacent batteries 8 are connected in parallel, positive electrode terminal 16a of one battery 8 and positive electrode terminal 16a of other battery 8 are arranged adjacent to each other.

A separator (not shown) is disposed between two adjacent batteries 8. Accordingly, the two batteries 8 are electrically insulated from each other. The separator is also called an insulating spacer, and is made of, for example, a resin sheet having an insulation property. Examples of the resin constituting the separator include resins such as polypropylene (PP), polybutylene terephthalate (PBT), polycarbonate (PC), and Noryl (registered trademark) resin (modified PPE).

The plurality of batteries 8 are sandwiched between a pair of end plates (not shown) in first direction X. The pair of end plates is adjacent to batteries 8 located at both ends in first direction X with the separator interposed therebetween. Each end plate is a metal plate made of metal such as iron, stainless steel, or aluminum.

The plurality of batteries 8 are constrained in first direction X by a pair of constraining members (not shown). The pair of constraining members is also called bind bars, and is long members elongated in first direction X. The pair of constraining members is arranged, for example, in second direction Y. Each constraining member is made of a metal such as iron or stainless steel.

The plurality of batteries 8 are sandwiched between the pair of end plates in first direction X while being alternately arranged with the plurality of separators. The pair of constraining members is disposed so as to sandwich the plurality of batteries 8, the plurality of separators, and the pair of end plates in second direction Y, and both ends of each constraining member are fixed to the pair of end plates. For example, the constraining member has bent portions overlapping with the main surface of the end plate at both ends in first direction X, and the bent portions are fixed to the end plate by screwing or the like. The plurality of batteries 8 are constrained in first direction X by the pair of constraining members and positioned in first direction X. Since the separator, the end plate, and the constraining member have known structures, illustration and detailed description thereof are omitted.

Output terminals 16 of adjacent batteries 8 are electrically connected to each other by bus bars 10. Bus bar 10 is a belt-shaped member made of metal such as aluminum or copper. One end part of bus bar 10 is connected to positive electrode terminal 16a of one of two adjacent batteries 8, and the other end part is connected to negative electrode terminal 16b of other battery 8. Bus bars 10 connect output terminals 16 of the plurality of adjacent batteries 8 having the same polarity in parallel to form a battery block, and further the battery blocks may be connected in series. In addition, external connection terminal 22 is attached to output terminal 16 of outermost battery 8 in first direction X. External connection terminal 22 is connected to an external load (not illustrated).

Support plate 4 is placed on an upper surface of battery stack 2. Support plate 4 is a plate-like member that supports voltage detection line 6. Support plate 4 and voltage detection line 6 constitute voltage detection line module 7.

Support plate 4 covers an upper surface of battery stack 2, that is, a surface on which valve portion 18 of each battery 8 is disposed. Support plate 4 includes base plate 24, a plurality of openings 26, and gas duct 20. Base plate 24 extends along an upper surface of battery stack 2. The plurality of openings 26 and gas duct 20 are provided in base plate 24.

The plurality of openings 26 are provided at positions overlapping with output terminals 16 of batteries 8 in third direction Z to expose output terminals 16. Bus bar 10 is placed in each of openings 26. The plurality of bus bars 10 are supported by support plate 4. Therefore, support plate 4 also functions as a so-called bus bar plate.

Gas duct 20 is a flow path into which gas ejected from each battery 8 flows. Base plate 24 has a plurality of openings (not shown) for exposing valve portions 18 at positions corresponding to valve portions 18 of batteries 8. Gas duct 20 extends in first direction X and overlaps each valve portion 18 in third direction Z. Each valve portion 18 communicates with gas duct 20 through an opening provided in base plate 24. The gas ejected from each battery 8 is temporarily stored in gas duct 20. Therefore, support plate 4 functions also as a so-called duct plate.

Support plate 4 of the present exemplary embodiment is made of a resin such as polypropylene (PP), polybutylene terephthalate (PBT), polycarbonate (PC), and Noryl (registered trademark) resin (modified PPE) except for a top surface of gas duct 20 facing each valve portion 18. The top surface of gas duct 20 is made of a metal plate such as iron or aluminum.

Voltage detection line 6 is a member for detecting voltages of the plurality of batteries 8. Voltage detection line 6 is electrically connected to the plurality of bus bars 10 to detect the voltages of batteries 8. Voltage detection line 6 includes a plurality of conductive wires 28 and insulating film 30 covering the plurality of conductive wires 28. One end of each conductive wire 28 is electrically connected to each corresponding bus bar 10 via tab terminal portion 32. Conductive wire 28 is joined to one end of tab terminal portion 32 by, for example, soldering. The other end of tab terminal portion 32 is joined to bus bar 10 by, for example, laser welding or ultrasonic joining. The other end of each conductive wire 28 is connected to connector 34. As a result, each bus bar 10 and connector 34 are electrically connected. Some of conductive wires 28 electrically connect external connection terminal 22 and connector 34. Connector 34 is connected to external battery ECU or the like. Battery ECU controls detection of a voltage or the like of each battery 8, charge and discharge of each battery 8, and the like. Conductive wire 28 may be directly connected to bus bar 10 without via tab terminal portion 32.

Figure 3:
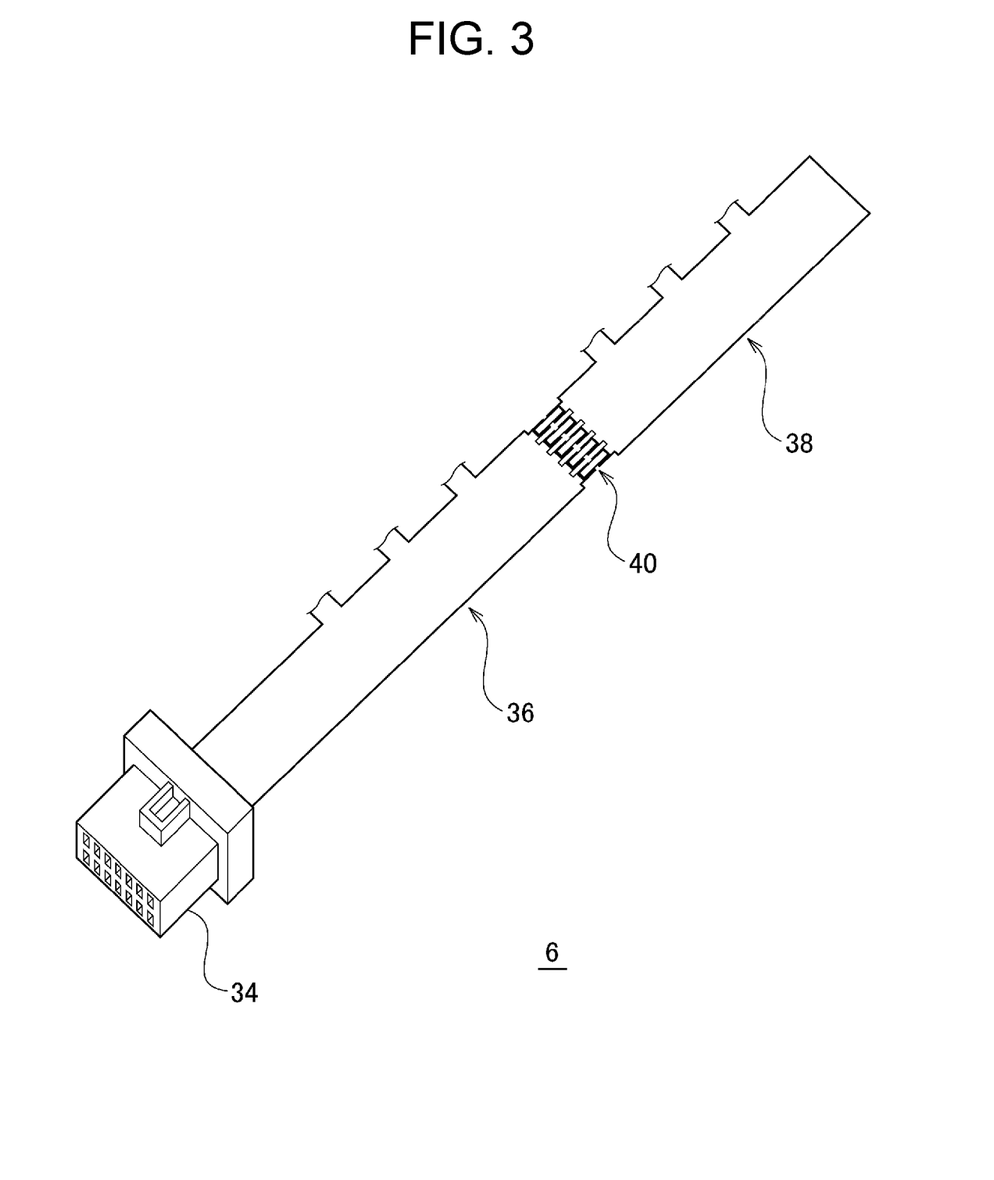
FIG. 3 is a perspective view of the voltage detection line according to the first exemplary embodiment.
Figure 4:
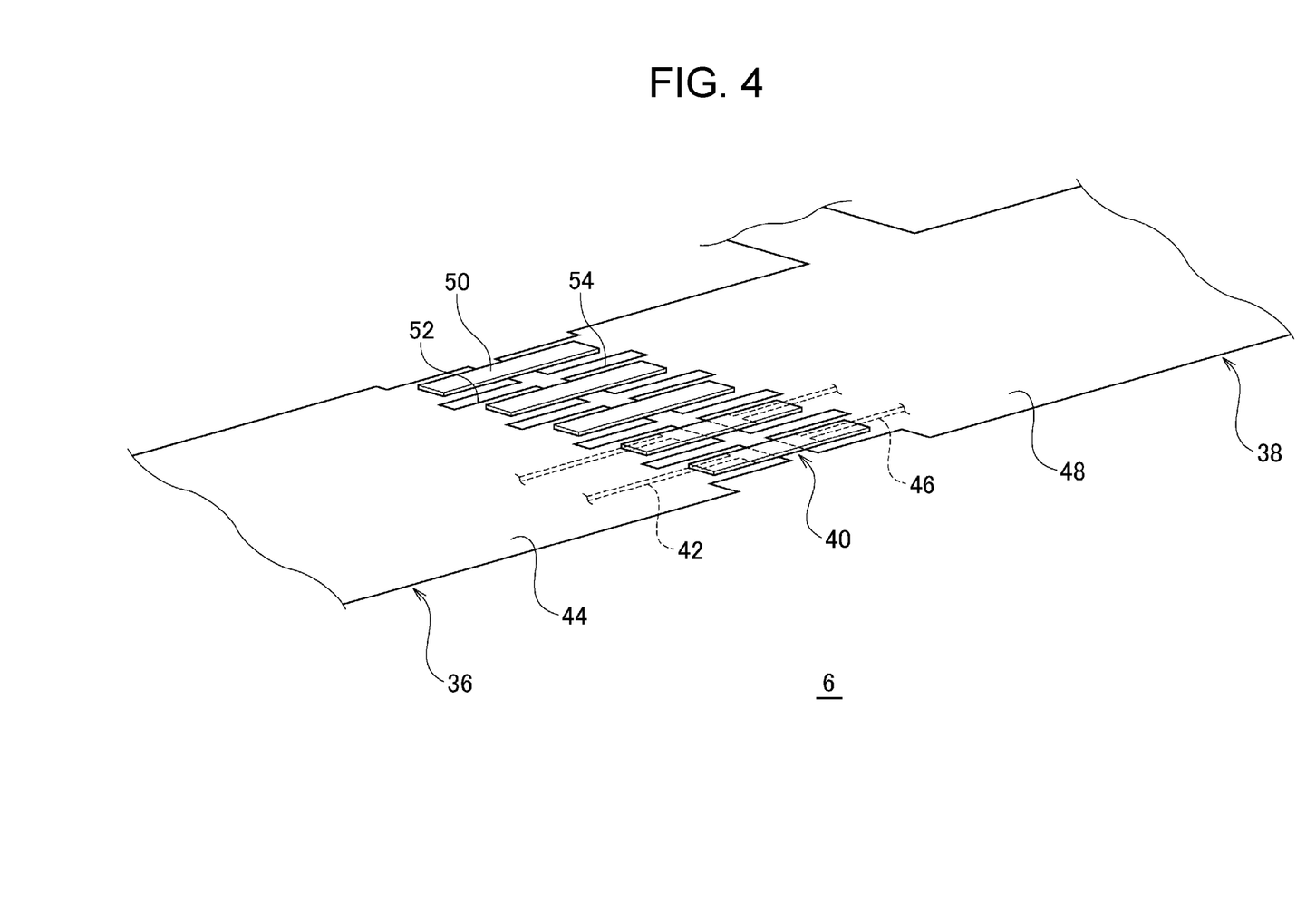
FIG. 4 is a perspective view of a part of the voltage detection line.

FIG. 3 is a perspective view of voltage detection line 6 according to the first exemplary embodiment. FIG. 4 is a perspective view of a part of voltage detection line 6. Note that FIGS. 3 and 4 schematically illustrate the flexible printed circuit boards, and how the flexible printed circuit boards extend, branch shapes, and the like are not particularly limited.

Voltage detection line 6 includes first flexible printed circuit board 36, second flexible printed circuit board 38, and connection part 40. One end of first flexible printed circuit board 36 is connected to connector 34. The other end of first flexible printed circuit board 36 is connected to second flexible printed circuit board 38 via connection part 40. Voltage detection line 6 may have a structure in which three or more flexible printed circuit boards are connected to each other via connection part 40.

First flexible printed circuit board 36 includes a plurality of first conductive wires 42 and first insulating film 44. The plurality of first conductive wires 42 are covered with first insulating film 44. Second flexible printed circuit board 38 includes a plurality of second conductive wires 46 and second insulating film 48. The plurality of second conductive wires 46 are covered with second insulating film 48. The plurality of first conductive wires 42 and the plurality of second conductive wires 46 constitute conductive wire 28, and first insulating film 44 and second insulating film 48 constitute insulating film 30. First conductive wire 42 and second conductive wire 46 are made of metal such as copper, for example. First insulating film 44 and second insulating film 48 are made of, for example, a resin such as polyimide (PI) or polyethylene naphthalate (PEN).

Connection part 40 is soldered to each of first conductive wires 42 and each of second conductive wires 46 corresponding to each other. As a result, first conductive wire 42 and second conductive wire 46 are electrically connected. Connection part 40 of the present exemplary embodiment has a plurality of metal members 50 soldered to each of first conductive wires 42 and each of second conductive wires 46. Each metal member 50 is made of a single metal piece. Each metal member 50 has a band shape, and has one end soldered to first conductive wire 42 and the other end soldered to second conductive wire 46.

One end of each first conductive wire 42 is connected to connector 34. The other ends of some of first conductive wires 42 are connected to bus bar 10 via tab terminal portion 32. The other ends of the other part of first conductive wires 42 are soldered to metal member 50 of connection part 40. One end of each second conductive wire 46 is soldered to metal member 50. The other ends of some of second conductive wires 46 are connected to bus bar 10 via tab terminal portion 32. Accordingly, the plurality of first conductive wires 42 and the plurality of second conductive wires 46 are electrically connected to the plurality of batteries 8.

Cutout portion 52 is provided in a region sandwiched between adjacent metal members 50 in first insulating film 44. Cutout portion 54 is provided in a region sandwiched between adjacent metal members 50 in second insulating film 48. Thus, the creepage distance between adjacent metal members 50 can be increased. Therefore, the insulation property between adjacent conductive wires 28 can be enhanced.

An adhesive may be interposed between each first conductive wire 42 and connection part 40 and between each second conductive wire 46 and connection part 40. As a result, the connection strength between each conductive wire and connection part 40 can be increased.

As described above, voltage detection line 6 according to the present exemplary embodiment includes first flexible printed circuit board 36 having the plurality of first conductive wires 42 and first insulating film 44 covering the plurality of first conductive wires 42, second flexible printed circuit board 38 having the plurality of second conductive wires 46 and second insulating film 48 covering the plurality of second conductive wires 46, and connection part 40 that is soldered to each of first conductive wires 42 and each of second conductive wires 46 corresponding to each other to electrically connect the plurality of first conductive wires 42 and the plurality of second conductive wires 46. In voltage detection line 6, the plurality of first conductive wires 42 and the plurality of second conductive wires 46 are electrically connected to a plurality of batteries 8 to detect voltages of the plurality of batteries 8.

In the present exemplary embodiment, first flexible printed circuit board 36 and second flexible printed circuit board 38 are connected by connection part 40. As a result, it is possible to elongate voltage detection line 6 formed of the flexible printed circuit board without increasing the size of manufacturing equipment for the flexible printed circuit board.

Connection part 40 is soldered to first conductive wire 42 and second conductive wire 46. Therefore, the connection strength of first conductive wire 42 and second conductive wire 46 can be increased as compared with the connection using an anisotropic conductive film (ACF) or a ZIF connector, which is a conventional general method for connecting a flexible printed circuit board. In addition, it is also possible to suppress the biting of the foreign matter into the joint portion, and it is possible to enhance the stability of the electrical connection of first conductive wire 42 and second conductive wire 46. Therefore, it is possible to elongate voltage detection line 6 while maintaining the reliability. In addition, it is possible to obtain voltage detection line 6 suitable for on-vehicle battery module 1 to which vibration and impact are easily applied from the outside. As a result, the safety of battery module 1 on which voltage detection line 6 is mounted can be further enhanced.

In addition, connection part 40 of the present exemplary embodiment includes a plurality of metal members 50 soldered to each of first conductive wires 42 and each of second conductive wires 46. Each metal member 50 is formed of a single metal piece. Thus, first flexible printed circuit board 36 and second flexible printed circuit board 38 can be connected with a simple structure.

Second Exemplary Embodiment

Figure 5A:
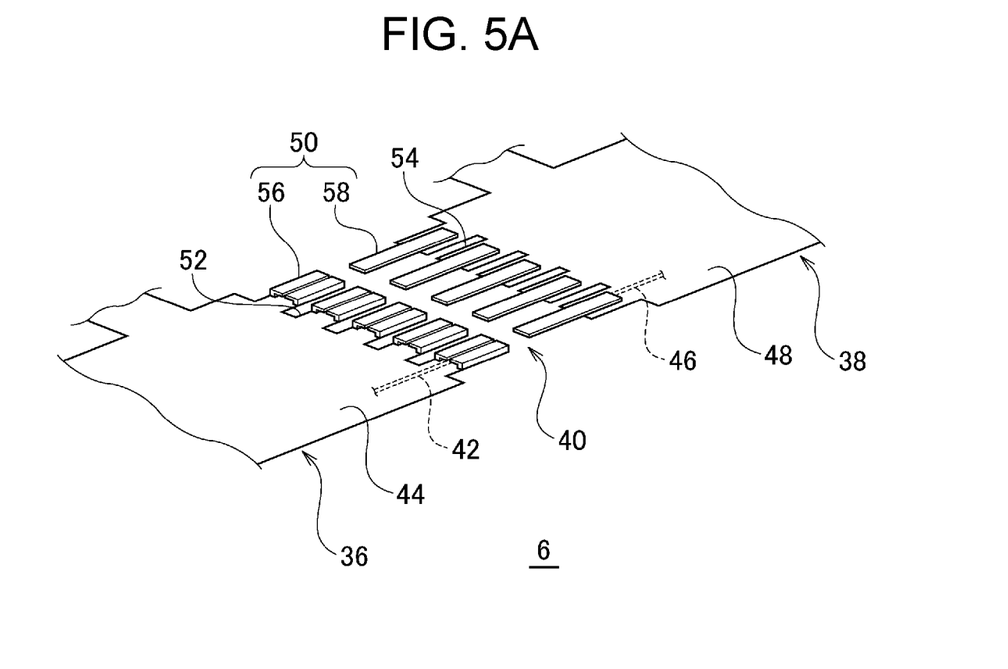
FIG. 5A is a perspective view of a part of a voltage detection line according to a second exemplary embodiment.
Figure 5B:
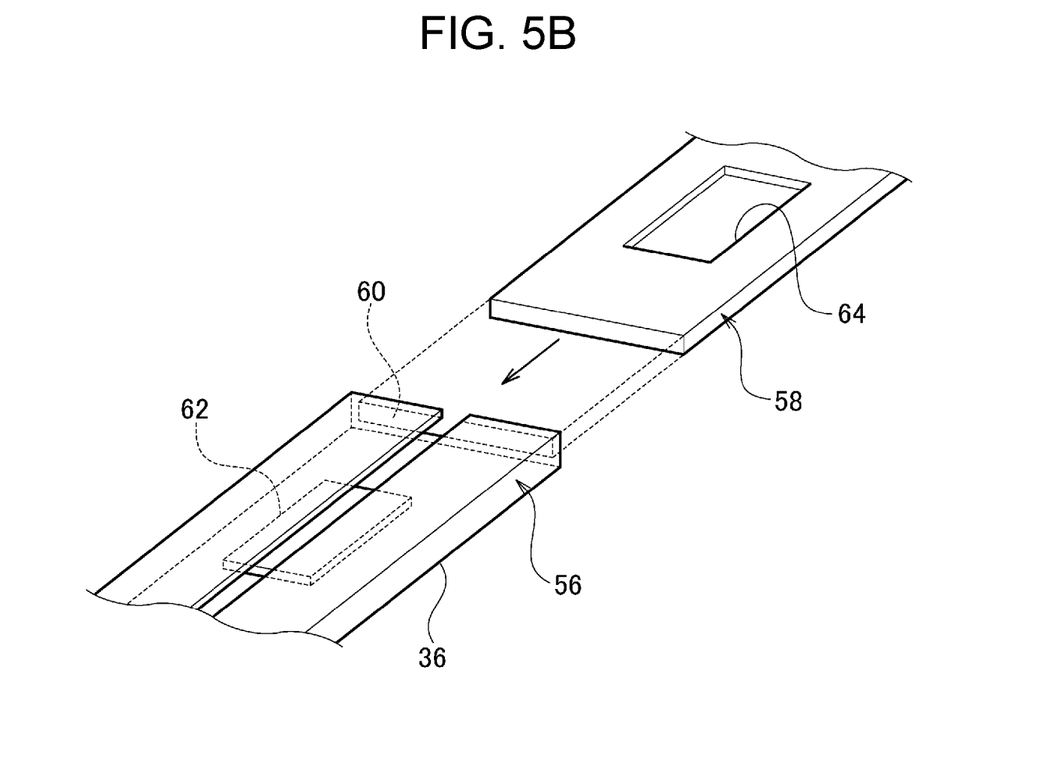
FIG. 5B is a perspective view of a connection part.
Figure 6A:
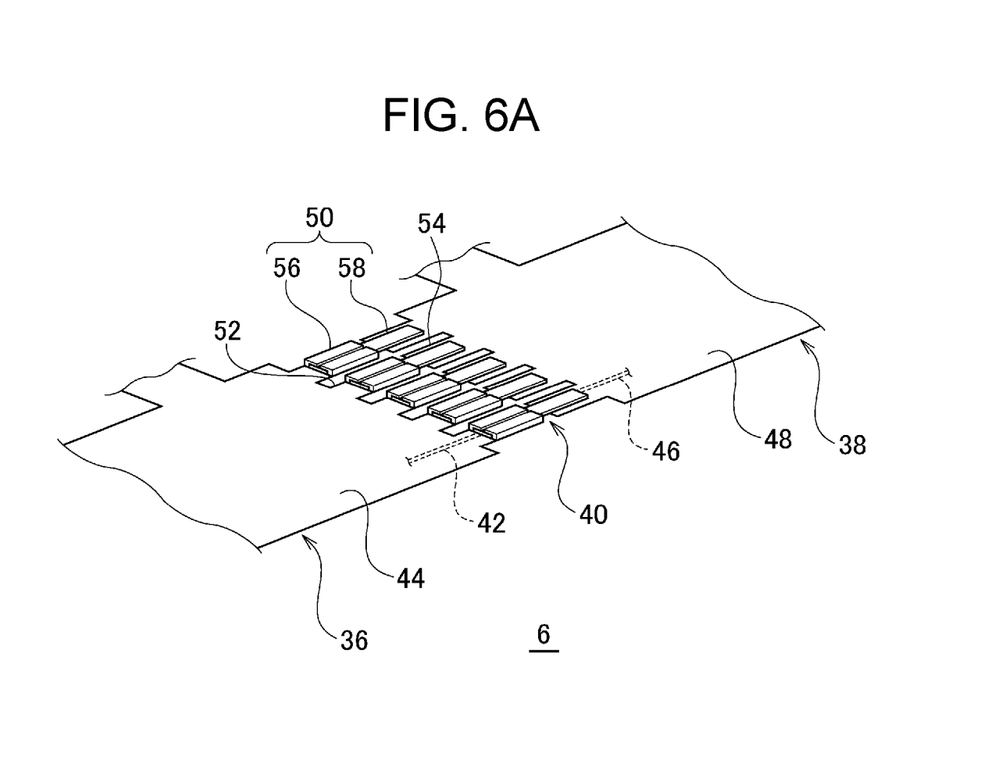
FIG. 6A is a perspective view of a part of the voltage detection line.
Figure 6B:
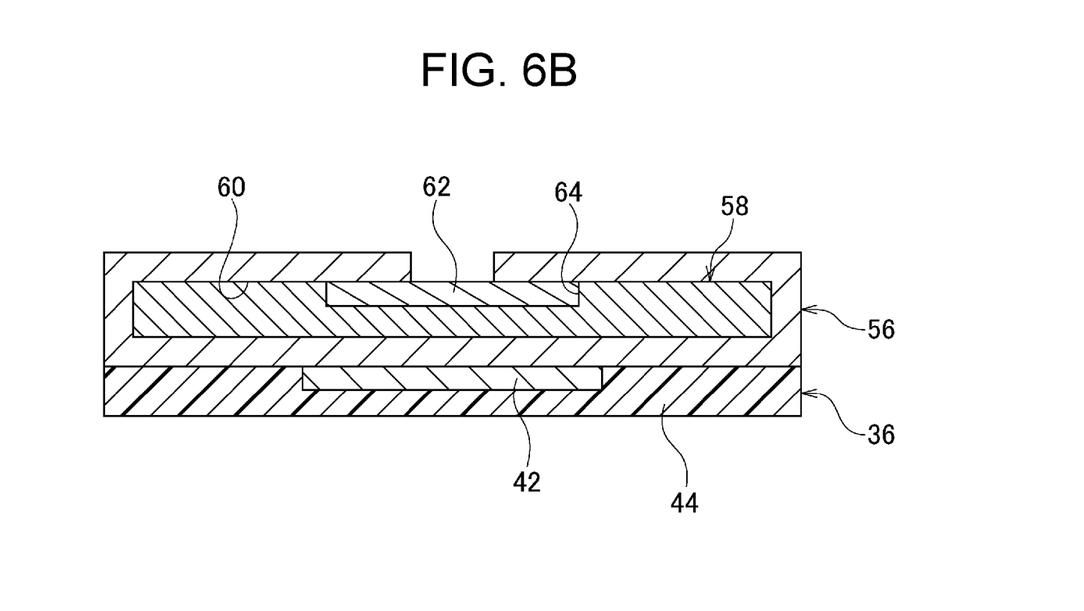
FIG. 6B is a cross-sectional view of the connection part.

The second exemplary embodiment has a configuration common to the first exemplary embodiment except for the structure of connection part 40. Hereinafter, the present exemplary embodiment will be described focusing on a configuration different from that of the first exemplary embodiment, and common configurations will be briefly described or description thereof will be omitted. FIG. 5A is a perspective view of a part of voltage detection line 6 according to the second exemplary embodiment. FIG. 5B is a perspective view of connection part 40. FIG. 6A is a perspective view of a part of voltage detection line 6. FIG. 6B is a cross-sectional view of connection part 40. FIGS. 5A and 5B illustrate a state in which first flexible printed circuit board 36 and second flexible printed circuit board 38 are separated. FIGS. 6A and 6B illustrate a state in which first flexible printed circuit board 36 and second flexible printed circuit board 38 are connected.

Voltage detection line 6 includes first flexible printed circuit board 36, second flexible printed circuit board 38, and connection part 40. Connection part 40 is soldered to each of first conductive wires 42 and each of second conductive wires 46 corresponding to each other. As a result, first conductive wire 42 and second conductive wire 46 are electrically connected.

Connection part 40 includes a plurality of metal members 50 soldered to each of first conductive wires 42 and each of second conductive wires 46. Each metal member 50 of the present exemplary embodiment has a structure divided into first part 56 soldered to first conductive wire 42 and second part 58 soldered to second conductive wire 46. First part 56 and second part 58 are fitted to each other to electrically connect first conductive wire 42 and second conductive wire 46. Therefore, first part 56 and second part 58 constitute a pair of connection terminals connected to each other.

As an example, first part 56 is a flat frame-shaped body and defines insertion hole 60 extending in the extending direction of first conductive wire 42. Protrusion 62 protruding toward the center of insertion hole 60 is provided at a predetermined position in insertion hole 60. Second part 58 is a flat plate having a shape corresponding to insertion hole 60, and has concave portion 64 having a shape corresponding to protrusion 62 on the main surface. Second part 58 is press-fitted into insertion hole 60 of first part 56. When second part 58 enters a predetermined position in insertion hole 60, protrusion 62 is accommodated in concave portion 64. As a result, first part 56 and second part 58 are fitted to each other. First part 56 may be a flat plate, and second part 58 may be a frame-shaped body.

In the present exemplary embodiment, first part 56 is directly soldered to first conductive wire 42, and second part 58 is directly soldered to second conductive wire 46 to fit first part 56 and second part 58 to each other. As a result, the connection strength of first conductive wire 42 and second conductive wire 46 can be increased, and the stability of the electrical connection of first conductive wire 42 and second conductive wire 46 can be enhanced. Therefore, it is possible to elongate voltage detection line 6 while maintaining the reliability.

Third Exemplary Embodiment

Figure 7A:
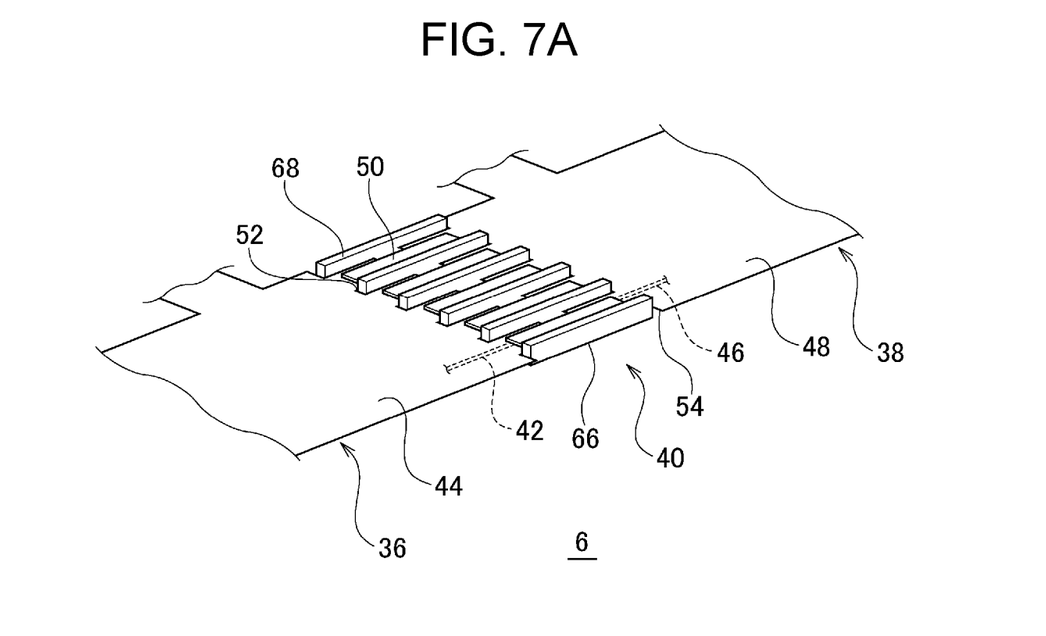
FIG. 7A is a perspective view of a part of a voltage detection line according to a third exemplary embodiment.
Figure 7B:
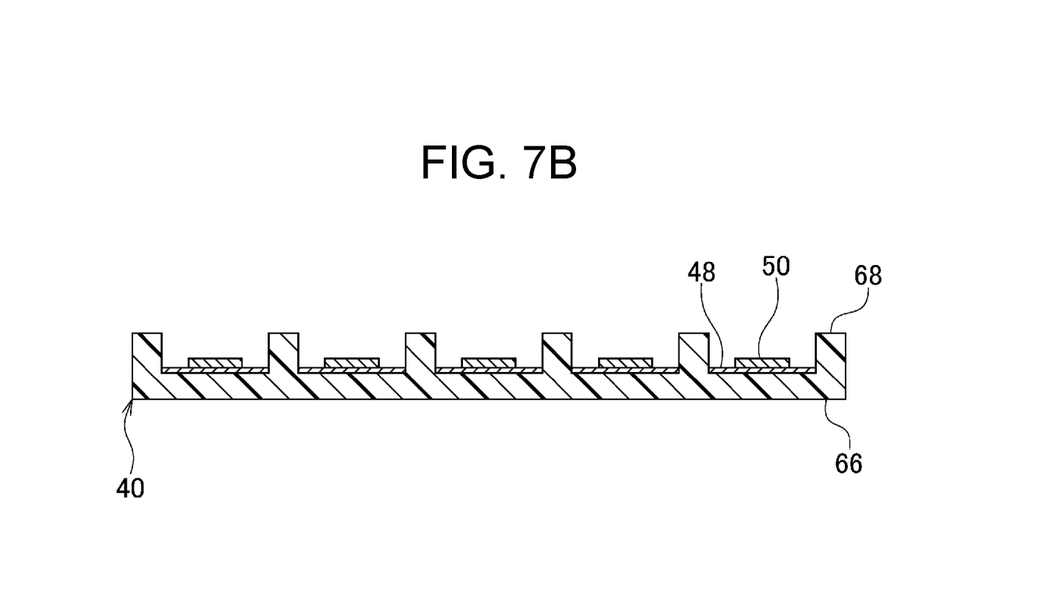
FIG. 7B is a cross-sectional view of the connection part.

The third exemplary embodiment has a configuration common to the first exemplary embodiment except for the structure of connection part 40. Hereinafter, the present exemplary embodiment will be described focusing on a configuration different from that of the first exemplary embodiment, and common configurations will be briefly described or description thereof will be omitted. FIG. 7A is a perspective view of a part of voltage detection line 6 according to the third exemplary embodiment. FIG. 7B is a cross-sectional view of connection part 40.

Voltage detection line 6 includes first flexible printed circuit board 36, second flexible printed circuit board 38, and connection part 40. Connection part 40 is soldered to each of first conductive wires 42 and each of second conductive wires 46 corresponding to each other. As a result, first conductive wire 42 and second conductive wire 46 are electrically connected. Connection part 40 of the present exemplary embodiment has a plurality of metal members 50 soldered to each of first conductive wires 42 and each of second conductive wires 46. Each metal member 50 is formed of a single metal piece as in the first exemplary embodiment. Each metal member 50 may be divided into first part 56 and second part 58 as in the second exemplary embodiment.

Connection part 40 of the present exemplary embodiment has plate part 66 that supports the plurality of metal members 50. Plate part 66 is a flat plate made of an insulating resin or the like, and is interposed between the plurality of metal members 50 and support plate 4. As a result, the creepage distance between the outside and each metal member 50 can be increased. Therefore, the insulation property of connection part 40 can be enhanced, and the reliability of voltage detection line 6 can be further enhanced. Plate part 66 may be formed of a part of support plate 4.

In addition, connection part 40 of the present exemplary embodiment has wall part 68 that separates adjacent metal members 50. Wall part 68 is made of an insulating resin or the like. Wall part 68 is fitted into, for example, cutout portion 52 and cutout portion 54. By providing wall part 68, the creepage distance between adjacent metal members 50 can be increased. Therefore, insulation property of connection part 40 can be enhanced.

In the present exemplary embodiment, plate part 66 and the plurality of wall parts 68 are integrally molded. This can suppress an increase in the number of components of voltage detection line 6. Further, it is possible to prevent the assembling operation of voltage detection line 6 from becoming complicated.

Fourth Exemplary Embodiment

Figure 8:
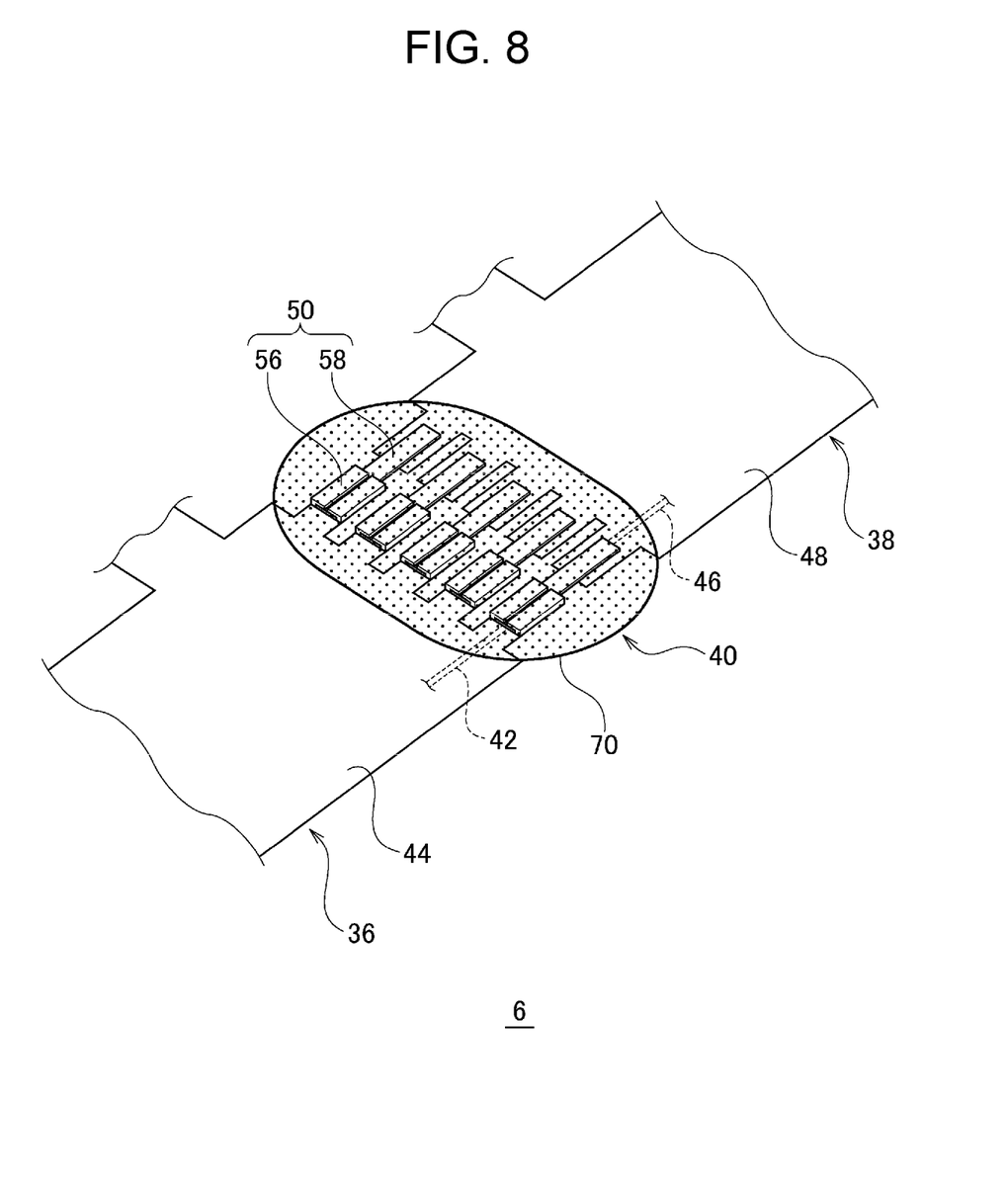
FIG. 8 is a perspective view of a part of a voltage detection line according to a fourth exemplary embodiment.

The fourth exemplary embodiment has a configuration common to the first exemplary embodiment except for the structure of connection part 40. Hereinafter, the present exemplary embodiment will be described focusing on a configuration different from that of the first exemplary embodiment, and common configurations will be briefly described or description thereof will be omitted. FIG. 8 is a perspective view of a part of voltage detection line 6 according to the fourth exemplary embodiment.

Voltage detection line 6 includes first flexible printed circuit board 36, second flexible printed circuit board 38, and connection part 40. Connection part 40 is soldered to each of first conductive wires 42 and each of second conductive wires 46 corresponding to each other. As a result, first conductive wire 42 and second conductive wire 46 are electrically connected. Connection part 40 includes a plurality of metal members 50 soldered to each of first conductive wires 42 and each of second conductive wires 46. Each metal member 50 of the present exemplary embodiment has a structure divided into first part 56 and second part 58 as in the second exemplary embodiment. Each metal member 50 may be formed of a single metal piece as in the first exemplary embodiment.

Connection part 40 of the present exemplary embodiment has sealing resin layer 70 that seals a joint portion with first conductive wire 42 and a joint portion with second conductive wire 46. Sealing resin layer 70 is made of, for example, a resin such as phenol, acrylic, epoxy, silicone, polyolefin, urethane, or silyl acrylate. By covering the joint portion between each conductive wire and connection part 40 with sealing resin layer 70, the connection strength between each conductive wire and connection part 40 can be increased. In addition, the insulation property of connection part 40 can be enhanced.

Fifth Exemplary Embodiment

Figure 9:
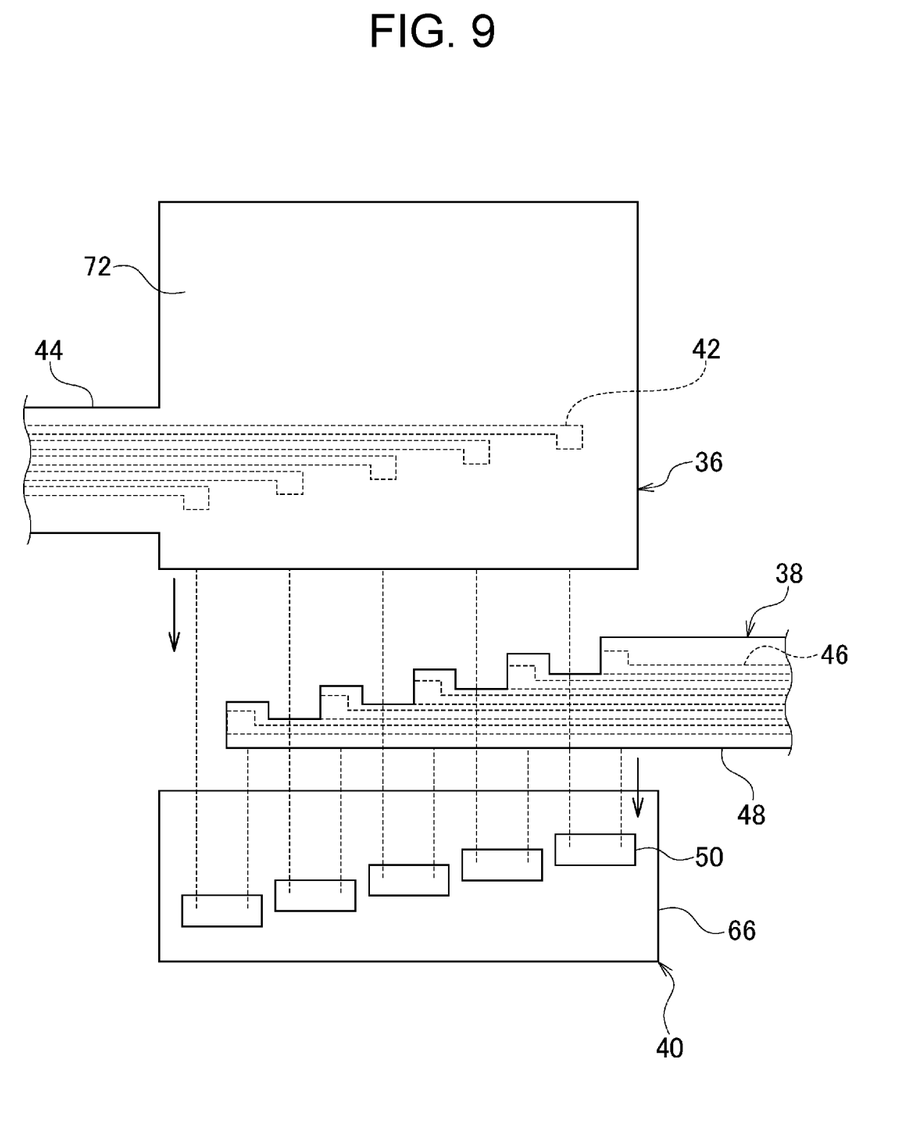
FIG. 9 is a view illustrating a step of assembling a voltage detection line according to a fifth exemplary embodiment.
Figure 10A:
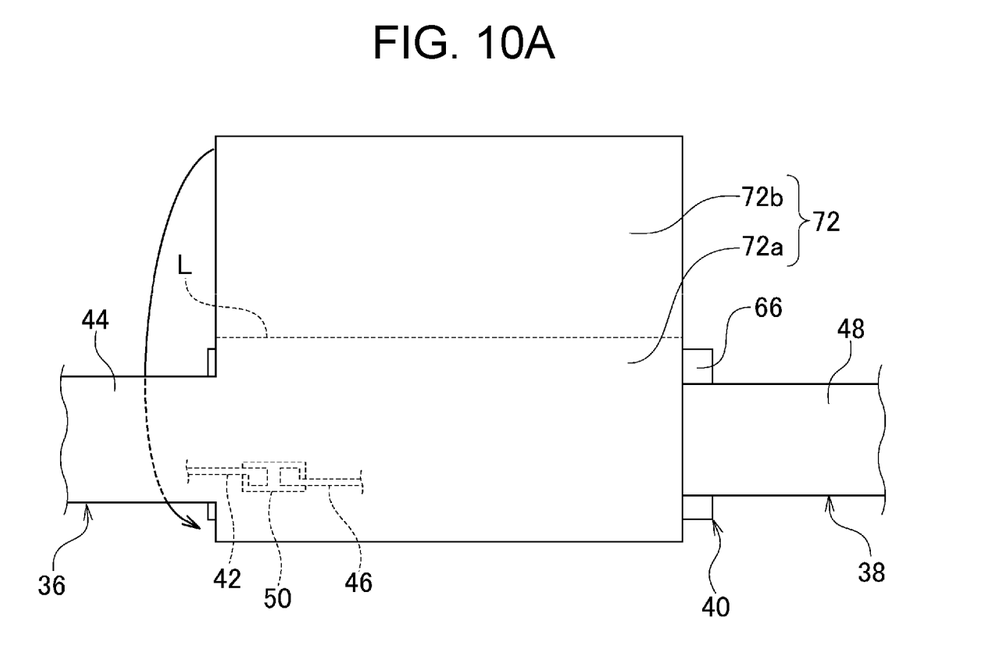
FIGS. 10A and 10B are diagrams illustrating the step of assembling the voltage detection line according to the fifth exemplary embodiment.
Figure 10B:
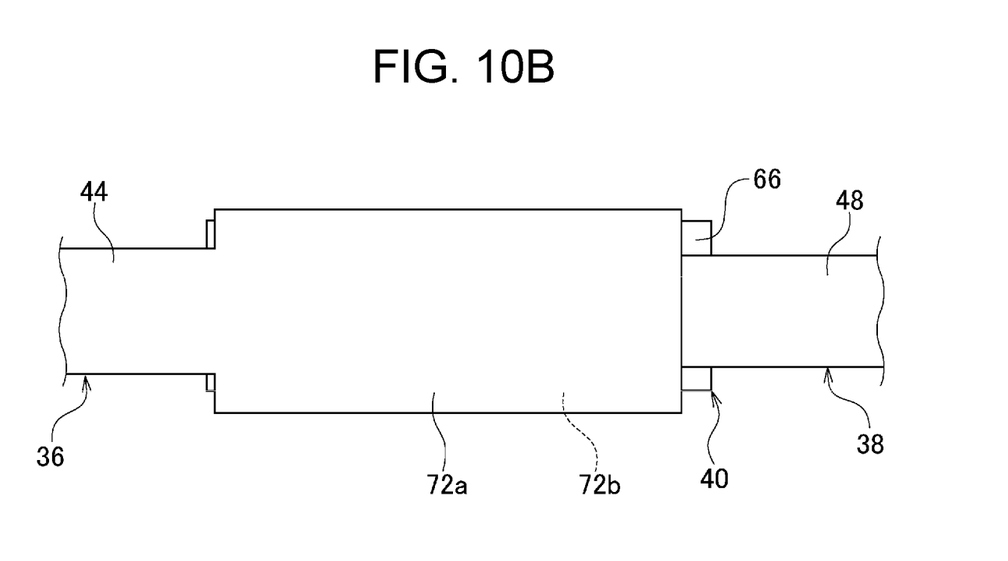

The fifth exemplary embodiment has a configuration common to the first exemplary embodiment except for the structure of connection part 40. Hereinafter, the present exemplary embodiment will be described focusing on a configuration different from that of the first exemplary embodiment, and common configurations will be briefly described or description thereof will be omitted. FIGS. 9, 10A, and 10B are diagrams illustrating the step of assembling voltage detection line 6 according to the fifth exemplary embodiment.

Voltage detection line 6 includes first flexible printed circuit board 36, second flexible printed circuit board 38, and connection part 40. Connection part 40 includes a plurality of metal members 50 soldered to each of first conductive wires 42 and each of second conductive wires 46. Each metal member 50 is formed of a single metal piece as in the first exemplary embodiment. Connection part 40 has plate part 66 as in the third exemplary embodiment. Each metal member 50 is fixed to one main surface of plate part 66.

First insulating film 44 of the present exemplary embodiment has wide part 72 at the end part near connection part 40. Wide part 72 extends in a direction intersecting the extending direction of first conductive wire 42. The width of wide part 72 in the intersecting direction is wider than plate part 66, and is, for example, about twice as wide as plate part 66.

As illustrated in FIG. 9, first, second conductive wire 46 of second flexible printed circuit board 38 is soldered to metal member 50. Next, first conductive wire 42 of first flexible printed circuit board 36 is soldered to metal member 50. As a result, as shown in FIG. 10A, first flexible printed circuit board 36 and second insulating film 48 are connected by connection part 40. In this state, the main surface of plate part 66 to which metal member 50 is fixed is covered with first region 72a corresponding to approximately half of wide part 72. Then, second region 72b of the remaining half of wide part 72 is folded back along folding line L.

As a result, as illustrated in FIG. 10B, the main surface opposite to plate part 66 is covered with second region 72b. That is, connection part 40 is wrapped by wide part 72. By heating wide part 72 in this state, wide part 72 is thermally welded to connection part 40. As a result, the connection strength between each conductive wire and connection part 40 can be increased. In addition, the insulation property of connection part 40 can be enhanced. Connection part 40 does not need to have plate part 66. In addition, metal member 50 may include first part 56 and second part 58.

Sixth Exemplary Embodiment

Figure 11:
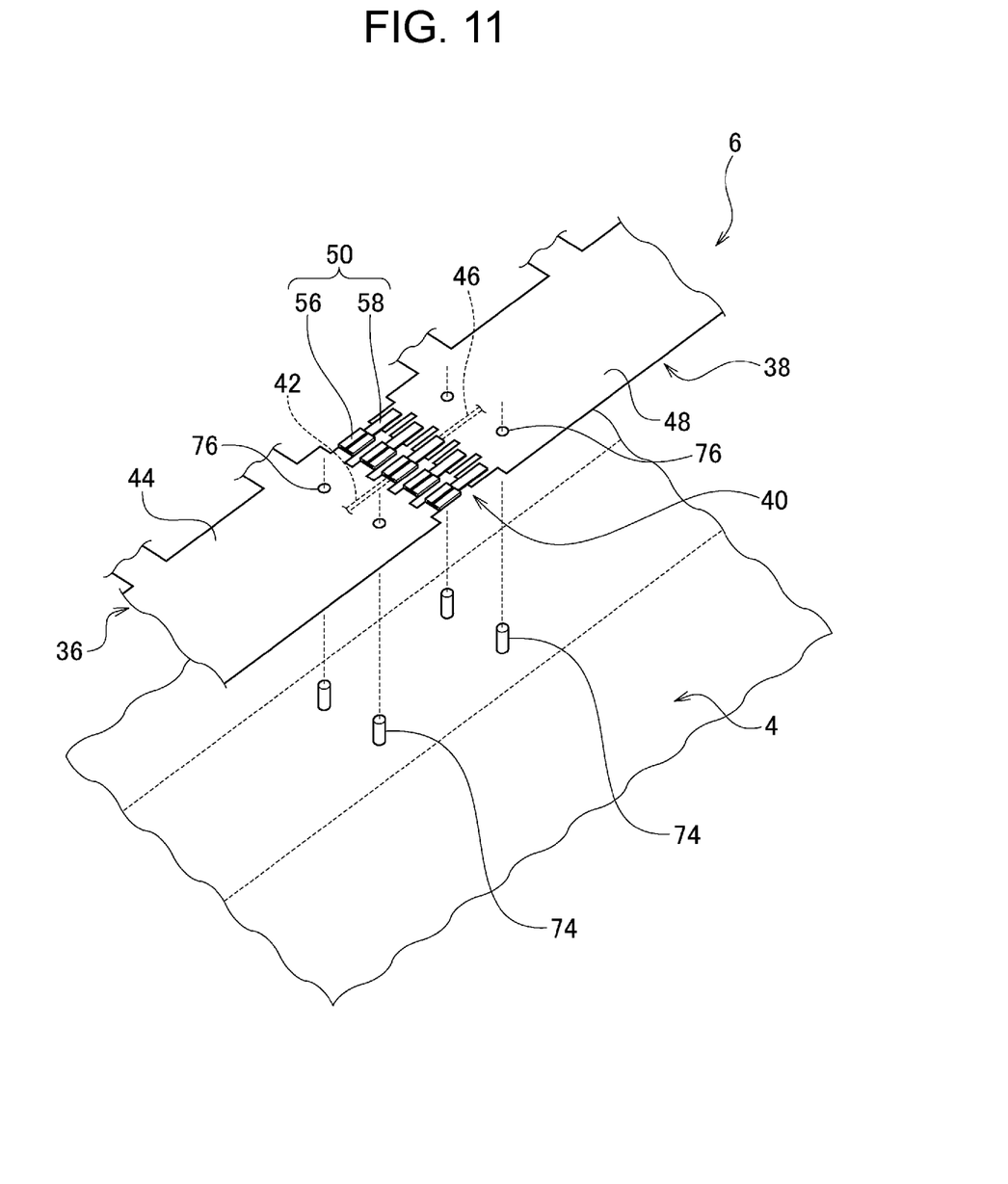
FIG. 11 is a perspective view of a part of a voltage detection line and a support plate according to a sixth exemplary embodiment.

The sixth exemplary embodiment has a configuration common to the first exemplary embodiment except for the structures of support plate 4 and voltage detection line 6. Hereinafter, the present exemplary embodiment will be described focusing on a configuration different from that of the first exemplary embodiment, and common configurations will be briefly described or description thereof will be omitted. FIG. 11 is a perspective view of a part of voltage detection line 6 and support plate 4 according to the sixth exemplary embodiment.

Voltage detection line 6 includes first flexible printed circuit board 36, second flexible printed circuit board 38, and connection part 40. Connection part 40 is soldered to each of first conductive wires 42 and each of second conductive wires 46 corresponding to each other. As a result, first conductive wire 42 and second conductive wire 46 are electrically connected. Connection part 40 includes a plurality of metal members 50 soldered to each of first conductive wires 42 and each of second conductive wires 46. Each metal member 50 of the present exemplary embodiment has a structure divided into first part 56 and second part 58 as in the second exemplary embodiment. Each metal member 50 may be formed of a single metal piece as in the first exemplary embodiment.

Support plate 4 has protrusion 74 in a region where voltage detection line 6 is placed. Protrusion 74 protrudes toward voltage detection line 6. Protrusion 74 is provided in a region where first flexible printed circuit board 36 overlaps and a region where second flexible printed circuit board 38 overlaps. In addition, preferably, protrusion 74 is disposed in the vicinity of a region overlapping connection part 40.

Each of first flexible printed circuit board 36 and second flexible printed circuit board 38 has hole 76. Hole 76 has a shape corresponding to protrusion 74 and is provided at a position overlapping protrusion 74.

Voltage detection line 6 is placed on support plate 4 in a state where protrusion 74 and hole 76 are aligned so as to overlap each other. As a result, protrusion 74 is fitted into hole 76, and voltage detection line 6 is positioned with respect to support plate 4. As a result, when battery module 1 vibrates or an impact is applied to battery module 1, it is possible to suppress stress from being applied to connection part 40. Therefore, it is possible to elongate voltage detection line 6 while maintaining the reliability. When at least one of first flexible printed circuit board 36 and second flexible printed circuit board 38 has hole 76, the connection reliability between first flexible printed circuit board 36 and second flexible printed circuit board 38 can be considerably enhanced.

The exemplary embodiments of the present disclosure have been described in detail above. The above-described exemplary embodiments are merely specific examples for implementing the present disclosure. The contents of the exemplary embodiments do not limit the technical scope of the present invention, and many design changes such as changes, additions, and deletions of configuration elements can be made without departing from the spirit of the present disclosure defined in the claims. The new exemplary embodiment to which the design change is made has the effect of each of the combined exemplary embodiment and modifications. In the above-described exemplary embodiments, the contents that can be changed in design are emphasized with notations such as "of the present exemplary embodiment" and "in the present exemplary embodiment", but the design change is allowed even in the contents without such notations. Any combination of configuration elements included in the exemplary embodiments is also effective as an aspect of the present disclosure.

The number of batteries 8 provided in battery module 1 is not particularly limited. The structure of each part of battery stack 2 including the constraining structure of the plurality of batteries 8 is not particularly limited. Battery 8 may have a cylindrical shape or the like.

The exemplary embodiment may be specified by items described below.

[Item 1]

Battery module (1) including:

a plurality of batteries (8); and voltage detection line (6) electrically connected to the plurality of batteries (8) to detect voltages of the plurality of batteries (8), in which voltage detection line (6) includes:

first flexible printed circuit board (36) including a plurality of first conductive wires (42) and first insulating film (44) covering the plurality of first conductive wires (42);

second flexible printed circuit board (38) including a plurality of second conductive wires (46) and second insulating film (48) covering the plurality of second conductive wires (46); and connection part (40) that is soldered to each of first conductive wires (42) and each of second conductive wires (46) corresponding to each other to electrically connect the plurality of first conductive wires (42) and the plurality of second conductive wires (46).

REFERENCE MARKS IN THE DRAWINGS 4 support plate
6 voltage detection line
7 voltage detection line module
8 battery
36 first flexible printed circuit board
38 second flexible printed circuit board
40 connection part
42 first conductive wire
44 first insulating film
46 second conductive wire
48 second insulating film
50 metal member
56 first part
58 second part
66 plate part
68 wall part
70 sealing resin layer
72 wide part
74 protrusion
76 hole

The invention claimed is:

1. A voltage detection line, comprising:

a first flexible printed circuit board including a plurality of first conductive wires and a first insulating film covering the plurality of first conductive wires;

a second flexible printed circuit board including a plurality of second conductive wires and a second insulating film covering the plurality of second conductive wires; and a connection part that is soldered to each of the plurality of first conductive wires and corresponding one to the plurality of second conductive wires to electrically connect the plurality of first conductive wires and the plurality of second conductive wires, wherein the plurality of first conductive wires and the plurality of second conductive wires are electrically connected to a plurality of batteries to detect voltages of the plurality of batteries, the connection part includes each of a plurality of metal members soldered to the each of the plurality of first conductive wires and the corresponding one to the plurality of second conductive wires, the each of the plurality of metal members has a structure divided into a first part soldered and a second part soldered, the first part soldered to the each of the plurality of first conductive wires and the second part soldered to the corresponding one to the plurality of second conductive wires, and the first part and the second part are fitted to each other to electrically connect the each of the plurality of first conductive wires and the corresponding one to the plurality of second conductive wires.

2. The voltage detection line according to claim 1, wherein the connection part includes a plate part that supports the plurality of metal members.

3. The voltage detection line according to claim 1, wherein the connection part includes a wall part that separates adjacent two metal members of the plurality of metal members.

4. The voltage detection line according to claim 1, wherein the connection part includes a sealing resin layer that seals a joint portion with the plurality of first conductive wires and a joint portion with the plurality of second conductive wires.

5. The voltage detection line according to claim 1, wherein the first insulating film includes a wide part at an end part on a connection part side, and the connection part is wrapped by the wide part.

6. A voltage detection line module, comprising:

the voltage detection line according to claim 1; and a support plate that supports the voltage detection line, wherein the support plate includes a protrusion, and at least one of the first flexible printed circuit board and the second flexible printed circuit board includes a hole into which the protrusion is fitted.

\* \* \* \* \*